United States Patent
Cao et al.

(10) Patent No.: US 11,646,460 B2
(45) Date of Patent: May 9, 2023

(54) METHOD FOR RECYCLING POSITIVE PLATE OF LITHIUM-ION BATTERY

(71) Applicants: Huazhong University of Science and Technology, Hubei (CN); Wuhan Rikomay New Energy Co., Ltd., Hubei (CN)

(72) Inventors: Yuancheng Cao, Hubei (CN); Weixin Zhang, Hubei (CN); Shun Tang, Hubei (CN); Yuzhen Zhao, Hubei (CN); Shouding Li, Hubei (CN)

(73) Assignee: Wuhan Rikomay New Energy Co., Ltd., Wuhan (CN)

( * ) Notice: Subject to any disclaimer, the term of this patent is extended or adjusted under 35 U.S.C. 154(b) by 0 days.

(21) Appl. No.: 17/337,730

(22) Filed: Jun. 3, 2021

(65) Prior Publication Data

US 2021/0288359 A1 Sep. 16, 2021

(30) Foreign Application Priority Data

Sep. 22, 2020 (CN) .......................... 202011001909.0

(51) Int. Cl.
*H01M 4/00* (2006.01)
*H01M 10/54* (2006.01)
*H01M 4/58* (2010.01)

(52) U.S. Cl.
CPC ......... *H01M 10/54* (2013.01); *H01M 4/5825* (2013.01)

(58) Field of Classification Search
CPC .... H01M 10/0525; H01M 10/54; H01M 4/62; H01M 4/5825; H01M 4/136; H01M 2004/028
See application file for complete search history.

(56) References Cited

U.S. PATENT DOCUMENTS

| 4,153,451 A | * | 5/1979 | Crasto | ..................... C22B 13/02 75/432 |
| 2002/0124386 A1 | * | 9/2002 | Hosoya | ................. H01M 4/136 423/306 |
| 2021/0376399 A1 | * | 12/2021 | Morin | ....................... C22B 3/26 |
| 2021/0384262 A1 | * | 12/2021 | Jin | ..................... H01L 51/5275 |

FOREIGN PATENT DOCUMENTS

| CN | 105895854 A | 8/2016 |
| CN | 110085939 A | 8/2019 |

* cited by examiner

*Primary Examiner* — Cynthia H Kelly
*Assistant Examiner* — Monique M Wills

(57) ABSTRACT

A method for recycling a lithium iron phosphate positive plate with low energy consumption and low Al content, including: crushing a lithium iron phosphate positive plate to be recycled into a granular material with a particle size of 1-15 mm by using a crusher; heating the granular material obtained in step (1) to 350-500° C. in an atmosphere furnace in an inert atmosphere; and keeping the granular material at 350-500° C. for 0.5-2 h followed by cooling to a preset temperature to obtain a calcined product; grinding the calcined product obtained in step (2) by using a grinder to obtain a ground product with D50 larger than or equal to 50 μm; and classifying the ground product obtained in step (3) by using an air classifier to remove Al simple substance to obtain a recovered positive material with an Al content below 200 ppm.

8 Claims, 4 Drawing Sheets

METHOD FOR RECYCLING POSITIVE PLATE OF LITHIUM-ION BATTERY

CROSS-REFERENCE TO RELATED APPLICATIONS

This application claims the benefit of priority from Chinese Patent Application No. 202011001909.0, filed on Sep. 22, 2020. The content of the aforementioned application, including any intervening amendments thereto, is incorporated herein by reference.

TECHNICAL FIELD

The present application relates to recycling of waste lithium-ion batteries, and more particularly to a method for recycling a positive plate of a lithium-ion battery.

BACKGROUND OF THE INVENTION

In recent years, lithium-ion batteries have been extensively used in the fields of batteries of electric vehicles, energy storage power supply systems, electric tools, electric bicycles, electric motorcycles, military equipment, aerospace and 3C (computer, communication and consumer electronic). However, as the service life of lithium-ion batteries approaches, a large number of retired and waste batteries will be produced. Traditionally, these retired and waste batteries are mainly treated by a pyrometallurgical or hydrometallurgical process to recover the noble metals, such as Li and Co. However, the above-mentioned processes not only have a low recovery rate for various materials in lithium-ion batteries, but also will cause serious environmental pollution and high recycling cost. Therefore, in the future recycling process, it is feasible to disassemble the lithium-ion batteries and then recover the materials according to their respective types.

The positive plate is manufactured by coating a positive material slurry on a current collector (aluminum foil), where the positive material slurry contains a positive material, a conducive agent and a binder. The binder plays a film-forming role to enable the positive material to be uniformly coated and to adhere to the aluminum foil, ensuring the processing stability of materials. As for the recycle of the detached positive plate, the positive materials should be separated from the aluminum foil previously. However, it is difficult to completely separate the aluminum foil and the positive material in the positive electrode plate, leading to the poor performance of the recycled positive plate.

Currently, the recycle of the positive plate is mainly performed by a pyrometallurgical or hydrometallurgical process to recover valuable metals. Although the hydrometallurgy method has a higher leaching rate of Li, a large amount of basic liquid is needed in the later stage to neutralize the excess acid, causing a complicated process and a high cost. As for the pyrometallurgical calcination method, it is hard to control the Al content in the recovered positive material, and the recycled lithium iron phosphate products can not satisfy the related national standard.

Chinese Patent Application No. 201610425057.5 discloses a method for recycling the positive electrode scraps of lithium-ion batteries, in which the pyrometallurgical calcination process and the hydrometallurgical process are combined, and the obtained positive materials have an Al content below 10 ppm. However, the complicated process increases the recycling cost, and the positive materials with a large particle size are retained on the screen mesh of 200-400 mesh during the sieving, resulting in a recovery rate. Chinese Patent Application No. 201910377303.8 discloses a method for separating and recycling positive plates of wasted lithium-ion batteries, in which the positive plate is calcined and then subjected to vibration on a 5-100 mesh sieve for screening. This method can control the Al content below 0.05%, but the calcination is required to be carried out at a high temperature for a relatively long period of time, resulting in high energy consumption and limiting the industrial application.

In view of this, it is necessary to design a modified method for recycling positive plates of lithium-ion batteries with less energy consumption and higher practicability to solve the above-mentioned defects in the prior art.

SUMMARY

An object of this disclosure is to provide a method for recycling a positive plate of a lithium-ion battery to overcome the defects in the prior art.

To achieve the above-mentioned object, this disclosure provides a method for recycling a lithium iron phosphate positive plate, comprising:

(1) crushing a lithium iron phosphate positive plate to be recycled into a granular material with a particle size of 1-15 mm by using a crusher;

(2) heating the granular material obtained in step (1) to 350-500° C. in an atmosphere furnace in an inert atmosphere; and keeping the granular material at 350-500° C. for 0.5-2 h followed by cooling to a preset temperature to obtain a calcined product;

(3) grinding the calcined product obtained in step (2) by using a grinder to obtain a ground product with D50 larger than or equal to 50 μm; and (4) classifying the ground product obtained in step (3) by using an air classifier to remove Al simple substance to obtain a recovered positive material.

In some embodiments, in step (4), an Al content of the recovered positive material is less than 200 ppm.

In some embodiments, in step (1), the particle size of the granular material is 5-10 mm.

In some embodiments, in step (3), the D50 of the ground product is 50-80 μm.

In some embodiments, in step (2), an oxygen content in the atmosphere furnace is less than 1 ppm.

In some embodiments, in step (2), the preset temperature is less than or equal to 100° C.

In some embodiments, the inert atmosphere is nitrogen, argon, helium or a combination thereof.

In some embodiments, the atmosphere furnace is a roller furnace, a rotary furnace or a push-type slab furnace.

In some embodiments, in step (1), the lithium iron phosphate positive plate to be recycled is a positive plate of a lithium iron phosphate battery.

In some embodiments, in step (1), a part of an interior of the crusher contacting with the lithium iron phosphate positive plate to be recycled is coated with tungsten carbide; and in step (4), an interior of the air classifier is coated with tungsten carbide or ceramic lining.

The beneficial effects of the present disclosure are described as follows.

1. The method provided herein is capable of separating the positive material from an Al foil through steps of crushing, calcining, grinding, and air classification. By controlling the technological parameters, such as the particle size of the crushed material, calcination temperature and time and the particle size of the ground product, the recycling of the positive material can be performed with low energy consumption and low Al content.

2. The positive plates are first broken into broken granular material with a particle size of 1-15 mm, which facilitates accelerating the calcination speed and make the calcination process more thorough, enabling the calcination to be carried out under a reduced temperature for a shortened period of time. The calcination is performed at 350-500° C. for 0.5-2 h, during which the organic materials such as binders in the positive plates are oxidized and decomposed, so that the positive active substances can be separated from the Al foil. The particle sizes of the crushed material are moderate so that the calcining temperature and time can be reduced significantly compared with the prior art, which can efficiently decrease the energy consumption. The subsequent grinding process of the calcined material can mechanically separate the active materials from the Al-containing impurities therein at a certain extent to obtain the ground material with a D50 of 50-80 μm. Then with the help of an air classifier, the active materials can be efficiently separated from the Al foil according to their differences in particle size and density. Based on the above-mentioned processes, the method provided herein can control the Al content of the recovered positive material to be less than 200 ppm, so as to meet the related requirements of the positive material. In addition, this application has low energy consumption and green and efficient process, and is thus suitable for industrial application.

DETAILED DESCRIPTION OF EMBODIMENTS

To make the object, technical solutions, and beneficial effects clearer, the disclosure will be described in detail below with reference to accompanying drawings and embodiments.

It should be noted that the drawings only depict the structure and/or processing steps closely related to the solutions of the present disclosure, and do not show the irrelevant details to avoid obscuring the present disclosure.

Furthermore, it should also be noted that the terms "compromise", "include" or any other variants are intended to indicate non-exclusive inclusion so that the processes, methods, items, or equipment comprising a series of elements not only include the listed elements but also include other elements that are not displayed specifically, or include the inherent elements for the above-mentioned processes, methods, items or equipment.

Figure 1:
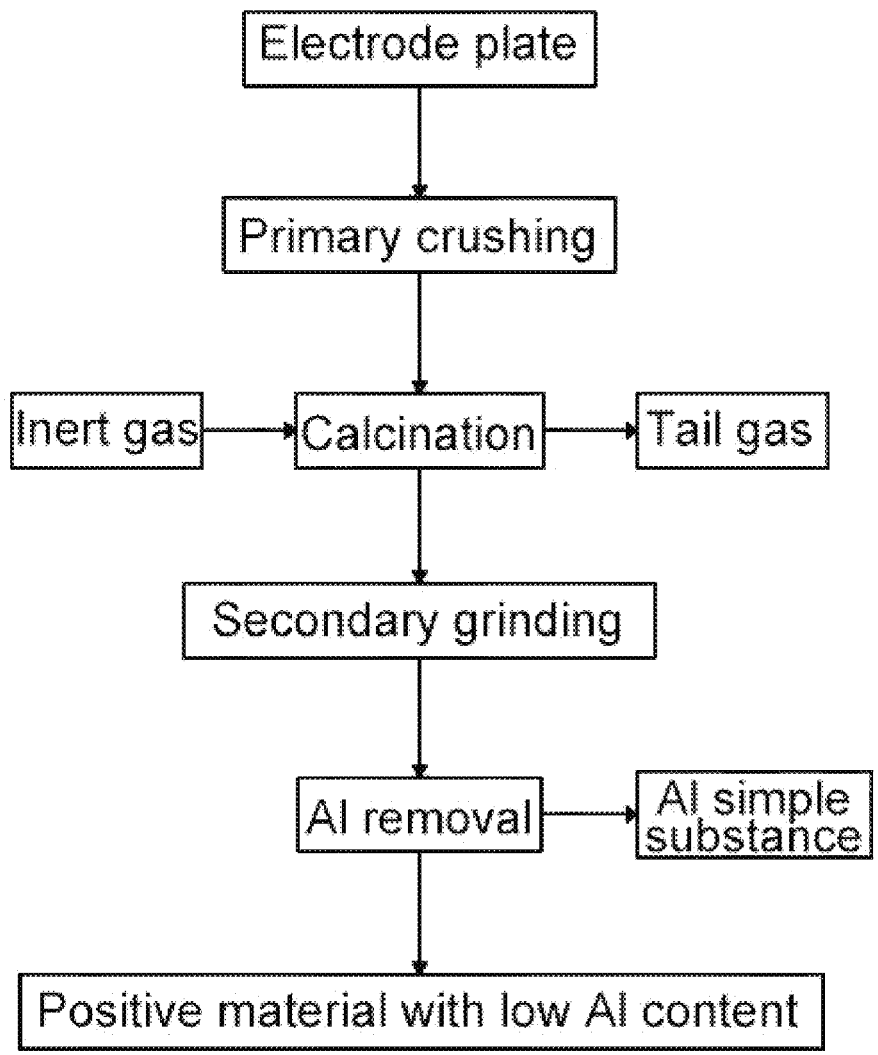
FIG. 1 is a flow chart of a method of recycling positive plates according to an embodiment of the present disclosure.

Referring to FIG. 1, this disclosure provides a method for recycling a lithium iron phosphate positive plate, which is specifically described as follows.

(1) Primary Crushing

A lithium iron phosphate positive plate to be recycled is crushed into a granular material with a particle size of 1-15 mm, preferably 5-10 mm, by using a crusher. In this case, the calcination can be accelerated, and the granular material has a greater permeability, which facilitates rendering the calcining process more thorough, resulting in a reduced calcination temperature and shortened calcination time. In the traditional pyrometallurgical process, it is less likely to crush the electrode plate into small particle size before the calcination considering that the Al foil will also be crushed at the same time, and the separation will become more difficult.

In an embodiment, the above-mentioned positive plate to be recycled is a positive plate of a lithium iron phosphate battery.

In an embodiment, a part of an interior of the crusher contacting with the above-mentioned positive plate to be recycled is coated with tungsten carbide.

(S2) Calcination

The granular material obtained in step (1) is heated to 350-500° C. in an atmosphere furnace under an inert atmosphere, kept at 350-500° C. for 0.5-2 h and then cooled to a preset temperature to obtain a calcined product.

In an embodiment, an oxygen content in the above-mentioned atmosphere furnace is less than 1 ppm. The oxygen content should be controlled strictly to prevent aluminum from oxidizing, avoiding an increase in Al content in the recovered material.

In an embodiment, the preset temperature is less than or equal to 100° C. If the preset temperature is too high, the crystal structure of the positive active material may be damaged due to the rapid cooling, and the positive active material may be also prone to oxidation after exposure to oxygen.

In an embodiment, the inert atmosphere is nitrogen, argon, helium or a combination thereof. The above-mentioned atmosphere furnace is a roller furnace, a rotary furnace, or a push-type slab furnace.

During the calcination process at 350-500° C., the polymer in the positive plate, such as binders, are oxidized and decomposed, so that the positive active substance can be separated from an aluminum foil. The particle size of the granular material is moderate, which facilitates lowering the calcination temperature and shortening the calcination time, allowing for lower energy consumption.

(3) Secondary Grinding

The calcined material obtained in step (2) is ground by using a grinder to obtain a ground material with D50 more than or equal to 50 μm.

In an embodiment, the D50 of the ground material is 50-80 μm. It has been found that the active substance may coat the aluminum foil during the calcination process. In view of this, the calcined material is further ground to mechanically separate the active materials from the Al foil. By contrast, in order to facilitate the separation of aluminum foil and active materials, it is less likely to subject the calcined product to another grinding treatment in the prior art.

(4) Removal of Al by Classification

The ground material obtained in step (3) is subjected to classification by using an air classifier to remove the Al simple substance to obtain a recycled positive material. With the help of the air classifier, the active material can be efficiently separated from the Al foil according to their differences in particle size and density.

In an embodiment, an interior of the air classifier is coated with tungsten carbide or ceramic lining.

Based on the above-mentioned processes, the method provided herein can control the Al content of the recovered positive material to be less than 200 ppm, so as to meet the related requirements of the positive material. In addition, this application has low energy consumption and green and efficient process, and is thus suitable for industrial application.

Example 1

Provided herein was a method for recycling a lithium iron phosphate positive plate with low energy consumption and low Al content, which was specifically described as follows.

(S1) A lithium iron phosphate positive plate to be recycled was crushed into a granular material with a particle size of about 5-10 mm by using a grinder.

(S2) The granular material was heated to 450° C. under $N_2$ atmosphere in a roller furnace, kept at 450° C. for 1 h and cooled to 95° C. to obtain a calcined material, where the temperature-rising process lasted for 2 h.

(S3) The calcined material was ground to obtain a ground product with D50 more than or equal to 50 μm by using a grinder.

(S4) The ground product was classified by using an air classifier to remove the Al simple substance to obtain a desired lithium iron phosphate positive material, which was detected by inductively coupled plasma (ICP) to have an Al content of 176 ppm.

Figure 2A:
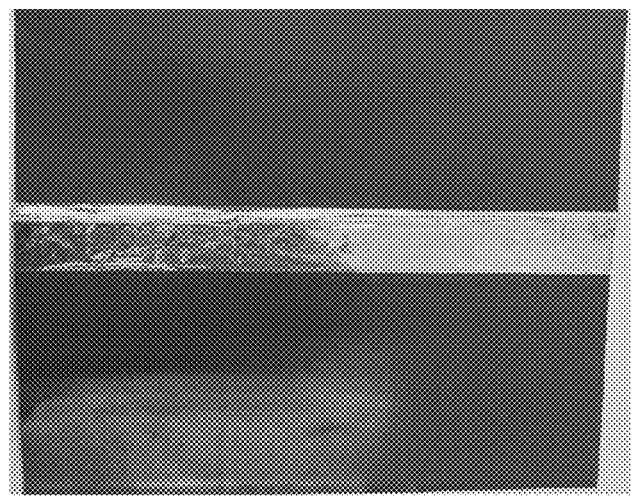
FIGS. 2A-2B are physical pictures of the lithium iron phosphate positive plates, where 2A: before the recycling process; and 2B: after the recycling process.
Figure 2B:

Referring to FIGS. 2A-2B, it can be seen that the lithium iron phosphate positive material was successfully separated from the Al foil.

Examples 2-6 and Comparative Examples 1-7

The methods provided in Examples 2-6 and Comparative Examples 1-7 were different from the method in Example 1 in the calcination temperature and time (listed in Table 1), and further with respect to the Comparative Examples 1~4 and 6, the step (S3) was absent.

TABLE 1

Preparation conditions and Al content of Examples 1-6 and Comparative examples 1-7

| Samples | Temperature (° C.) | Time (h) | Al content/ppm |
|---|---|---|---|
| Example 1 | 450 | 1 | 176 |
| Comparative Example 1 | 450 | 1 | 248.7 |
| Example 2 | 350 | 1 | 195.93 |
| Comparative Example 2 | 350 | 1 | 226.3 |
| Example 3 | 400 | 1 | 183 |
| Comparative Example 3 | 400 | 1 | 208.4 |
| Example 4 | 400 | 0.5 | 160.8 |
| Example 5 | 500 | 1 | 190.77 |
| Comparative Example 4 | 500 | 1 | 283.2 |
| Example 6 | 500 | 2 | 186.49 |
| Comparative Example 5 | 500 | 4 | 217.7 |
| Comparative Example 6 | 550 | 1 | 346.7 |
| Comparative Example 7 | 650 | 2 | 489.2 |

TABLE 2

Comparison of internal resistance of cells with different Al contents

| | Before formation | | After capacity grading | | |
|---|---|---|---|---|---|
| Groups | Voltage/ V | Internal resistance/ mΩ | Voltage/ V | Internal resistance/ mΩ | Capacity/ Ah |
| Commercially-available positive material | 0.1320 | 26.17 | 3.3310 | 29.27 | 1.15 |
| Positive material containing 400 ppm of Al | 0.0851 | 26.24 | 3.3302 | 35.23 | 1.15 |
| Positive material containing 1000 ppm of Al | 0.0779 | 28.00 | 3.3346 | 41.26 | 1.15 |

Figure 3:
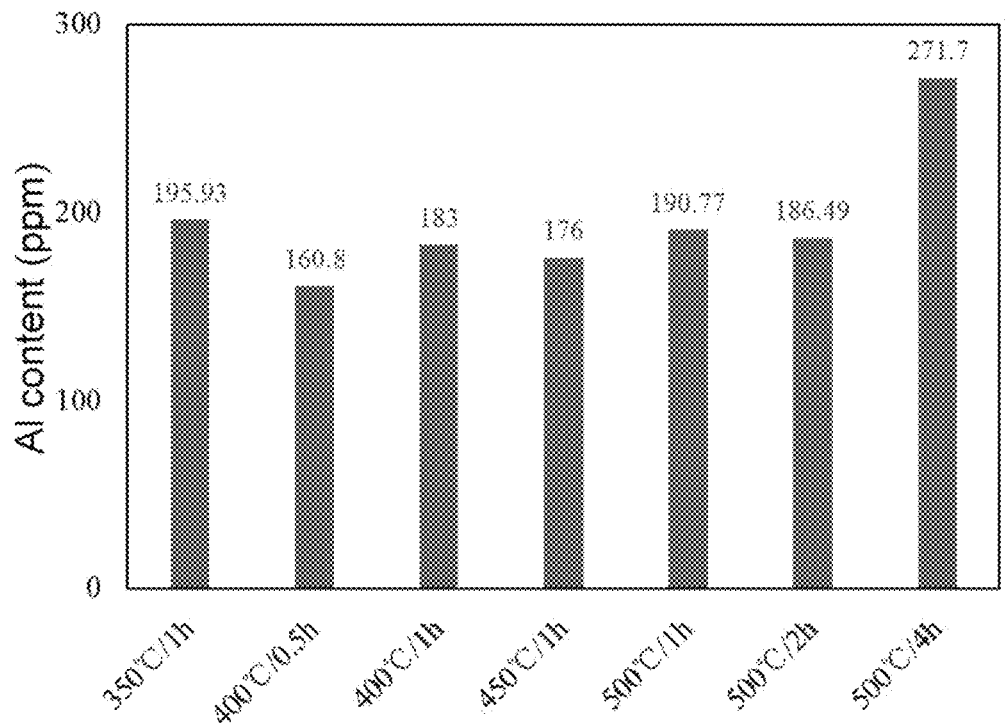
FIG. 3 shows effect of calcination temperature and time on Al content.
Figure 4:
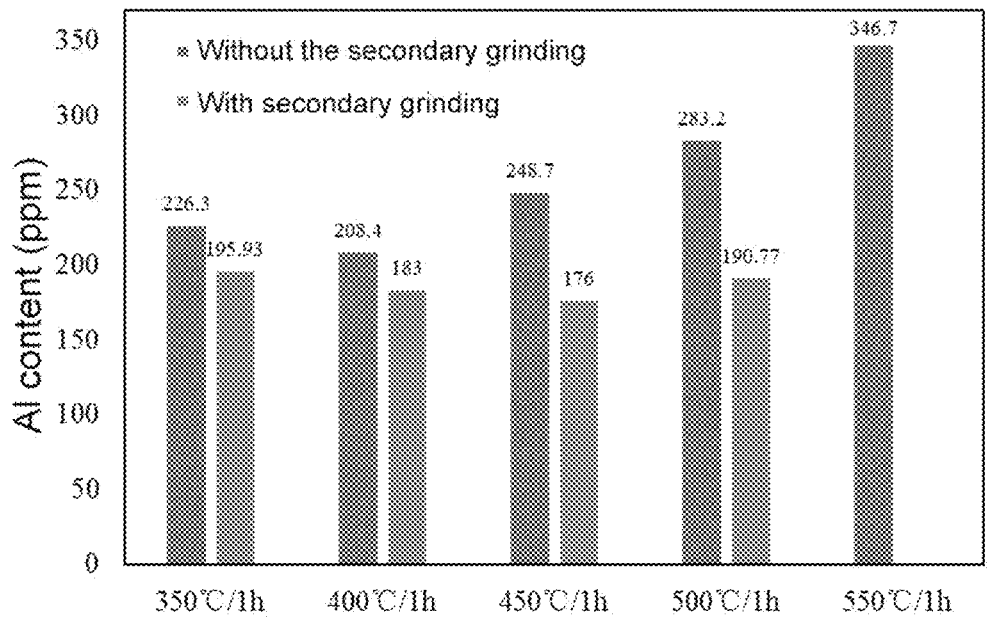
FIG. 4 shows effect of secondary grinding on Al content under different calcination temperatures and times.

As shown in Table 1 and FIGS. 3-4, when the calcination temperature in step (S2) was higher than 500° C., or the holding time in step (S2) was more than 2 h, the Al content in the recovered product exceeded 200 ppm, and the Al content increased with the rise of the calcination temperature. In addition, with regard to the comparative examples without the secondary grinding process, the Al content was increased significantly (more than 200 ppm). These results can be explained by that the calcined material was ground into a particle size of 50-80 μm, which can mechanically separate the active materials from the Al-containing impurities coated therein at a certain extent, and then with the help of an air classifier, the active materials were further separated from the Al foil according to their differences in particle size and density. Through the steps of primary crushing, calcination, secondary grinding and air classification, the method provided herein was capable of separating the positive active material from the aluminum foil by heating merely at 350-500° C. for 0.5-2 h, which can significantly reduce the energy consumption.

Figure 5:
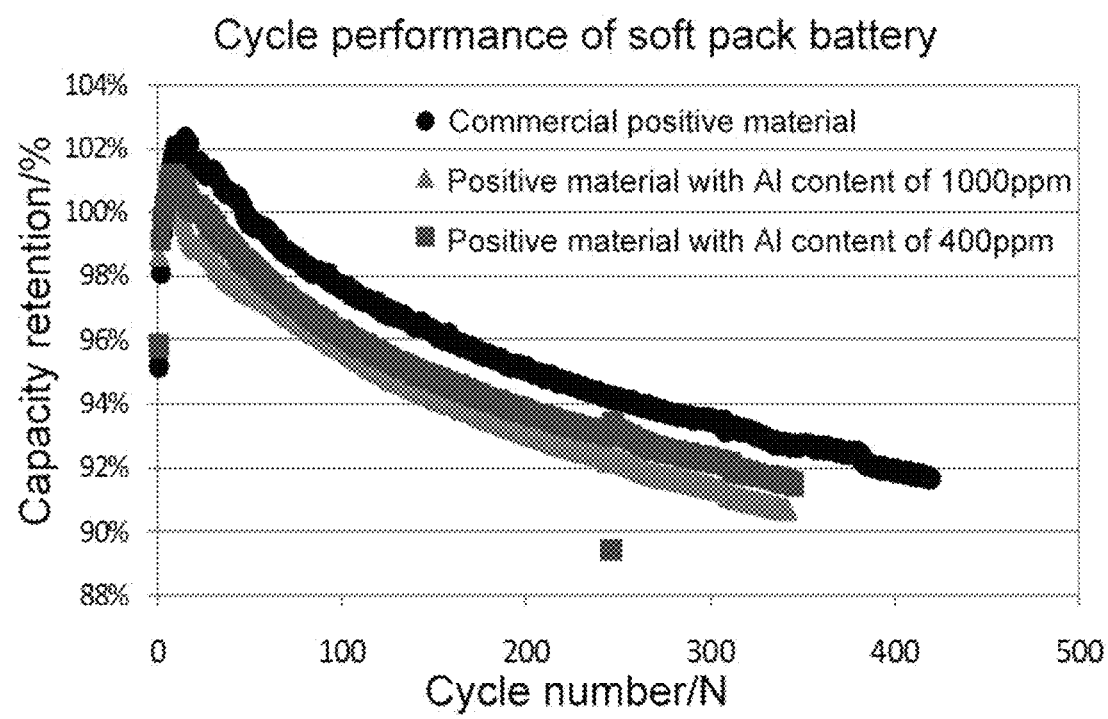
FIG. 5 illustrates comparison of positive materials with different Al impurity contents in terms of cell cycle performance.

It can be seen from Table 2 and FIG. 5 that with the increase of Al content in the positive materials, the voltage dropped and the internal resistance increased before the cell formation, while the internal resistance after the capacity grading increased significantly. As a consequence, the Al content in the positive material recovered by the method provided herein was below 200 ppm, which can improve the electrochemical performance of the positive materials.

Examples 7~9 and Comparative Example 8

The methods provided in Examples 7-9 and Comparative Example 8 were different from the method in Example 1 merely in the particle size of the crushed material and the D50 of the ground material (as shown in Table 3).

TABLE 3

Preparation conditions and Al content of Examples 7~9 and Comparative Examples 8

| Samples | Particle size of the crushed material (mm) | D50 of the ground material (μm) | Al content/ppm |
|---|---|---|---|
| Example 7 | 1-5 | 50-80 | 196 |
| Example 8 | 10-15 | 50-80 | 174 |
| Example 9 | 5-10 | 80-100 | 207 |
| Comparative example 8 | 5-10 | 30-50 | 234 |

As shown in Table 3, when the particle size of the crushed material obtained in step (S1) was in a range of 1-15 mm, if the D50 was more than 80 μm or less than 50 μm, the Al content of the obtained product would exceed 200 ppm. Only when the particle size of the crushed material in step (S1) was 1-15 mm and the D50 was 50-80 μm, could the Al content of the recovered products be controlled below 200 ppm. Therefore, in the primary crushing process, the positive plate was crushed into a particle size of 1-15 mm, which is conducive to accelerating the calcination process and rendering the calcining process more thorough, leading to a reduced calcining temperature and shortened calcining time. Then the calcined material was ground into a particle size of 50-80 μm, such that the active materials can be efficiently separated from the Al foil by using an air classifier according to their differences in particle size and density.

The positive plates are first broken into a granular material with a particle size of 1-15 mm, which facilitates accelerating the calcination and make the calcination process more thorough, enabling the calcination to be carried out under a reduced temperature for a shortened period of time. The calcination is performed at 350-500° C. for 0.5-2 h, during which the organic materials such as binders in the positive plates are oxidized and decomposed, so that the positive active substances can be separated from the Al foil. The particle sizes of the crushed material are moderate so that the calcining temperature and time can be reduced significantly compared with the prior art, which can efficiently decrease the energy consumption. The subsequent grinding process of the calcined material can mechanically separate the active materials from the Al-containing impurities therein at a certain extent to obtain the ground material with a D50 of 50-80 μm. Then with the help of an air classifier, the active materials can be efficiently separated from the Al foil according to their differences in particle size and density. Based on the above-mentioned processes, the method provided herein can control the Al content of the recovered positive material to be less than 200 ppm, so as to meet the related requirements of the positive material. In addition, this application has low energy consumption and green and efficient process, and is thus suitable for industrial application.

Described above are merely preferred embodiments of this application, which are not intended to limit the application. It should be understood that modifications and replacements made by those skilled in the art without departing from the spirit of the application should fall within the scope of the application.

What is claimed is:

1. A method for recycling a lithium iron phosphate positive plate, comprising;
    (1) crushing a lithium iron phosphate positive plate to be recycled into a granular material with a particle size of 1-15 mm by using a crusher;
    (2) heating the granular material obtained in step (1) to 350-500° C. in an atmosphere furnace in an inert atmosphere; and keeping the granular material at 350-500° C. for 0.5-2 h followed by cooling to a preset temperature to obtain a calcined product;
    (3) grinding the calcined product obtained in step (2) by using a grinder to obtain a ground product with D50 larger than or equal to 50 μm; and
    (4) classifying the ground product obtained in step (3) by using an air classifier to remove Al simple substance to obtain a recovered positive material;
    wherein in step (1), a part of an interior of the crusher contacting with the lithium iron phosphate positive plate to be recycled is coated with tungsten carbide; and
    in step (4), an interior of the air classifier is coated with tungsten carbide or ceramic lining.

2. The method of claim 1, wherein in step (4), an Al content of the recovered positive material is less than 200 ppm.

3. The method of claim 1, wherein in step (1), the particle size of the granular material is 5-10 mm.

4. The method of claim 1, wherein in step (3), the D50 of the ground product is 50-80 μm.

5. The method of claim 1, wherein in step (2), an oxygen content in the atmosphere furnace is less than 1 ppm.

6. The method of claim 1, wherein in step (2), the preset temperature is less than or equal to 100° C.

7. The method of claim 5, wherein the inert atmosphere is nitrogen, argon, helium or a combination thereof.

8. The method of claim 5, wherein the atmosphere furnace is a roller furnace, a rotary furnace or a push-type slab furnace.

* * * * *